US007667777B2

(12) United States Patent
Lee

(10) Patent No.: US 7,667,777 B2
(45) Date of Patent: Feb. 23, 2010

(54) ENHANCED IMAGE DISPLAY

(75) Inventor: Jae-Min Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 577 days.

(21) Appl. No.: 11/182,276

(22) Filed: Jul. 14, 2005

(65) Prior Publication Data

US 2006/0012718 A1 Jan. 19, 2006

(30) Foreign Application Priority Data

Jul. 16, 2004 (KR) ..................... 10-2004-0055719

(51) Int. Cl.
*H04N 9/77* (2006.01)
*H04N 9/69* (2006.01)

(52) U.S. Cl. ....................... 348/687; 348/673; 348/671; 348/675; 348/679; 348/254; 345/77

(58) Field of Classification Search ................. 348/687, 348/692, 673, 674, 675, 679, 671, 672, 254, 348/256; 345/77, 63; 382/274; 358/3.27
See application file for complete search history.

(56) References Cited

U.S. PATENT DOCUMENTS

| | | | | |
|---|---|---|---|---|
| 5,191,420 | A * | 3/1993 | Lagoni et al. | 348/687 |
| 5,432,566 | A * | 7/1995 | Tanaka et al. | 348/687 |
| 6,337,695 | B1 * | 1/2002 | Bang | 345/690 |
| 6,542,143 | B1 | 4/2003 | Ozawa | |
| 6,700,628 | B1 * | 3/2004 | Kim | 348/687 |
| 6,850,215 | B2 * | 2/2005 | Lee et al. | 345/89 |
| 6,879,310 | B2 * | 4/2005 | Nose | 345/88 |
| 7,102,695 | B2 * | 9/2006 | Han et al. | 348/673 |
| 7,102,698 | B2 * | 9/2006 | Kim et al. | 348/687 |
| 7,106,342 | B2 * | 9/2006 | Yoon et al. | 345/589 |
| 7,167,214 | B2 * | 1/2007 | Hirosue | 348/687 |
| 7,289,100 | B2 * | 10/2007 | Sohn et al. | 345/102 |
| 2002/0047550 | A1 | 4/2002 | Tanada | |
| 2002/0075216 | A1 | 6/2002 | Satake | |
| 2003/0234795 | A1 | 12/2003 | Lee | |
| 2004/0104883 | A1 | 6/2004 | Drader | |
| 2004/0257352 | A1 | 12/2004 | Naugler | |
| 2005/0219179 | A1 * | 10/2005 | Kim | 345/89 |

FOREIGN PATENT DOCUMENTS

| | | |
|---|---|---|
| JP | 1206775 | 8/1989 |
| JP | 05333318 | 12/1993 |

(Continued)

*Primary Examiner*—M. Lee
*Assistant Examiner*—Jean W Désir
(74) *Attorney, Agent, or Firm*—Lee, Hong, Degerman, Kang & Waimey

(57) ABSTRACT

A display device comprises a data input unit configured to convert an image signal to a color signal. The display device also comprises a brightness control unit operationally coupled to the data input unit, configured to extract a brightness level associated with the color signal, to subdivide the brightness level associated with the color signal, and to apply different voltages according to brightness level subdivisions to control brightness of the color signal. The display device also comprises a display unit configured to display the color signal according to controlled brightness. The brightness level may comprise gray levels of a γ curve. The color signal may comprise one of YUV or RGB signals.

25 Claims, 3 Drawing Sheets

FOREIGN PATENT DOCUMENTS

| | | | |
|---|---|---|---|
| JP | 2002132225 | | 5/2002 |
| JP | 2003140627 | | 5/2003 |
| JP | 2003195837 | | 7/2003 |
| JP | 2003241720 | | 8/2003 |
| JP | 2003259154 | A | 9/2003 |
| JP | 2003283874 | | 10/2003 |
| JP | 2004140702 | A | 5/2004 |
| KR | 10 2001 0092306 | A | 10/2001 |

* cited by examiner

ENHANCED IMAGE DISPLAY

CROSS-REFERENCE TO RELATED APPLICATIONS

Pursuant to 35 U.S.C. § 119(a), this application claims the benefit of earlier filing date and right of priority to Korean Application No. 10-2004-0055719, filed on Jul. 16, 2004, the contents of which are hereby incorporated by reference herein in their entirety.

FIELD OF THE INVENTION

The present invention relates generally to an image display and, more particularly, to enhancing display quality of inputted image signals in a mobile terminal.

BACKGROUND OF THE INVENTION

Mobile terminals typically include a display device, such as a liquid crystal display (LCD). When a user attempts to view an image stored in the mobile terminal or image data inputted from a camera, the mobile terminal converts the input image data into a RGB (Red-Green-Blue) or YUV (e.g., PAL system) signal, adjusts the converted signal according to a gray level of brightness, and differentially applies a voltage corresponding to the RGB or YUV signal by the gray level, thereby displaying the image data on the LCD. Normally, the YUV signal has 16 bits, 18 bits or 24 bits. When the converted YUV signal has 18 bits, the gray level number of the YUV signal is 512.

FIG. 1 is a graph showing a relationship between gray levels and input voltages.

Referring to FIG. 1, when an YUV signal inputted to an LCD having a predetermined γ value has 18 bits, the voltages inputted by the gray levels increase by the rise of the gray levels. In a typical display device, a γ curve may be represented by '$y=x^{\gamma}$', and in the case of a cathode ray tube (CRT) monitor, a γ curve has a γ value of '2.2'.

Generally, the γ curve is used to display externally-inputted image data on the LCD, and is provided by the manufacturer of the display device. In addition, the γ curve, which is based on the γ value, is used to vary the input voltage according to the brightness level of the input image data.

FIG. 2 is a graph showing a relationship between gray levels and input voltages in each gray level.

Referring to FIG. 2, the input voltages linearly increase according to the number of the gray levels. For example, FIG. 2 shows gray levels 256 and 257, out of a maximum 512 gray levels. A voltage of V1 is inputted in gray 256 and a voltage of V2 is inputted in gray 257.

However, the voltages inputted by the gray levels are restricted regardless of the brightness values of the image signal. Moreover, since the input voltages are restricted due to the linear increase of the γ curve, the brightness of the real image does not completely match the γ curve. As a result, the image displayed on the LCD is different from the real image.

SUMMARY OF THE INVENTION

Accordingly, the present invention is directed to an image display that substantially obviates one or more problems due to limitations and disadvantages of the related art.

An object of the present invention is to provide an image display device and method which may display an image like a real image by controlling brightness values of an image signal.

Another object of the present invention is to display an image like a real image by subdividing a γ curve of an image signal and applying different voltages according to the subdivided γ curves.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a display device comprises a data input unit configured to convert an image signal to a color signal. The display device also comprises a brightness control unit operationally coupled to the data input unit, configured to extract a brightness level associated with the color signal, to subdivide the brightness level associated with the color signal, and to apply different voltages according to brightness level subdivisions to control brightness of the color signal. The display device also comprises a display unit configured to display the color signal according to controlled brightness.

The brightness level may comprise gray levels of a γ curve. The color signal may comprise one of YUV or RGB signals. The brightness control unit may comprise means for extracting maximum and minimum brightness values of the color signal and means for subdividing the brightness level using the maximum and minimum brightness values. The brightness control unit may also comprise means for subdividing voltage sections associated with brightness level subdivisions and means for mapping brightness values associated with the brightness level subdivisions to the voltage sections. The brightness control unit may further comprise means for calculating a difference value between the maximum and minimum brightness values. The means for mapping the brightness values may obtain brightness distribution maps by mapping the brightness values one to one. The voltage sections may be set by the brightness distribution maps. The brightness may be controlled by applying voltages by set voltage sections. A number of voltage sections may be equal to a number of the brightness distribution maps. A number of voltage sections may be equal to a number of high distribution maps.

In another embodiment, a display method comprises converting an image signal to a color signal and extracting a brightness level associated with the color signal. The display method also comprises controlling brightness of the color signal by subdividing the brightness level and applying different voltages according to brightness level subdivisions. The display method also comprises displaying the color signal according to controlled brightness.

The step of controlling brightness of the color signal may comprise extracting maximum and minimum brightness values of the color signal and subdividing the brightness level using the maximum and minimum brightness values. The step of controlling brightness of the color signal may also comprise subdividing voltage sections associated with brightness level subdivisions and mapping brightness values associated with the brightness level subdivisions to the voltage sections. The step of controlling brightness of the color signal may further comprise calculating a difference value between the maximum and minimum brightness values. The step of mapping brightness values associated with the brightness level subdivisions to the voltage sections may further comprise obtaining brightness distribution maps by mapping the brightness values one to one.

In yet another embodiment, a mobile terminal configured to display images comprises a transceiver configured to transmit and receive signals and a display device operationally coupled to the transceiver. The display device comprises a data input unit configured to convert an image signal to a color signal. The display device also comprises a brightness control unit operationally coupled to the data input unit, configured to extract a brightness level associated with the color signal, to subdivide the brightness level associated with the color signal, and to apply different voltages according to brightness level subdivisions to control brightness of the color signal. The display device also comprises a display unit configured to display the color signal according to controlled brightness.

The image signal may be provided by the transceiver to the data input unit. The mobile terminal may further comprise a camera operationally coupled to the display device, configured to provide the image signal to the data input unit. The mobile terminal may further comprise a memory operationally coupled to the display device and the camera, configured to store image data associated with an image signal provided by the camera, the image data to provide an image signal to the data input unit.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

In one embodiment, an image is displayed like a real image by applying a variable γ curve according to brightness values of RGB (Red-Green-Blue) or YUV (e.g., PAL system) signals. The present invention may preferably be used in a mobile terminal.

Figure 1:
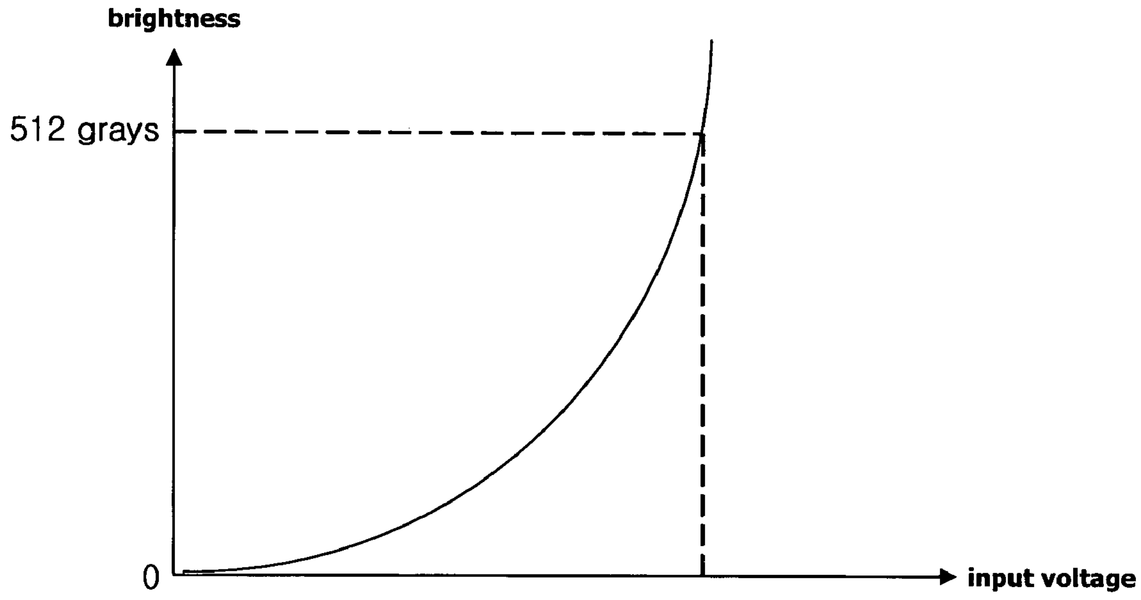
FIG. 1 RELATED ART
FIG. 1 is a graph showing a relationship between gray levels and input voltages.
Figure 2:
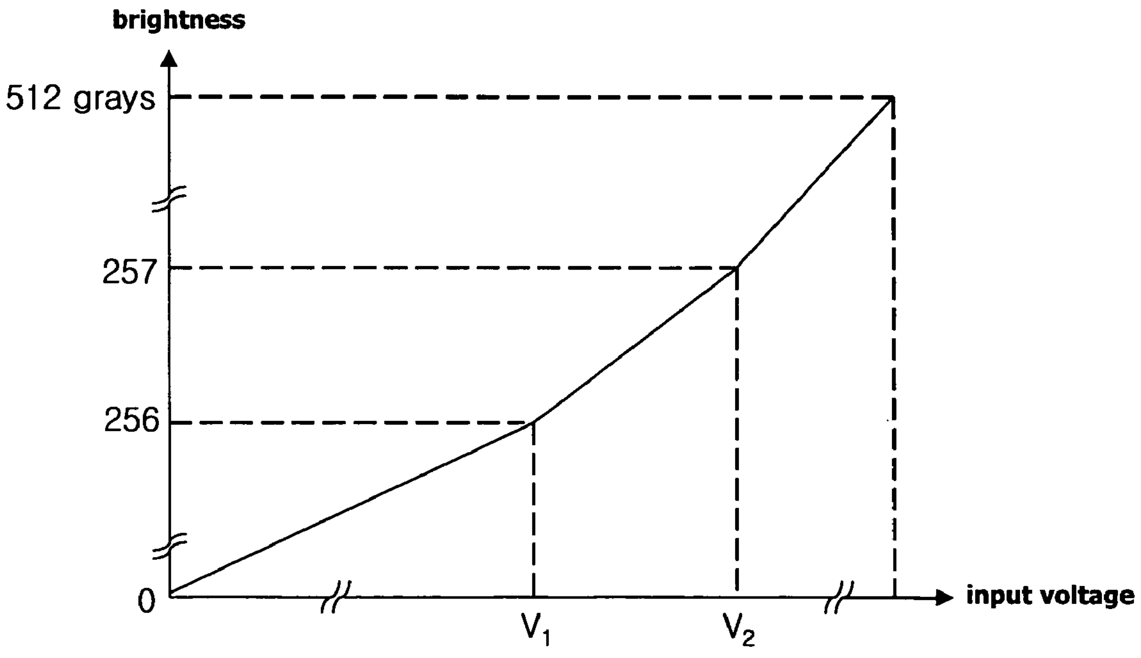
FIG. 2 RELATED ART
FIG. 2 is a graph showing a relationship between gray levels and input voltages in each gray level.
Figure 3:
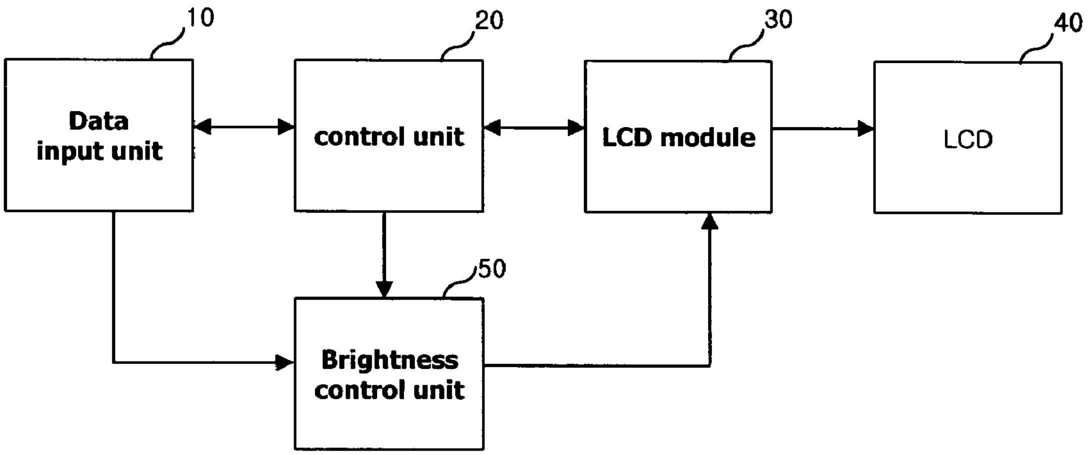
FIG. 3 is a block diagram illustrating an image display device for an LCD device, according to an embodiment of the present invention.

FIG. 3 is a block diagram illustrating an image display device for an LCD device, according to an embodiment of the present invention.

Referring to FIG. 3, the image display device includes a data input unit 10, a control unit 20, an LCD module 30, an LCD 40 and a brightness control unit 50. The LCD 40 may be a built-in LCD.

The image display device in accordance with the present invention is described in detail below. When a user attempts to view an image inputted from a camera or an image stored in a storage device of a mobile terminal using the LCD 40, the data input unit 10 converts the image signal from the camera or the storage device into an RGB or YUV signal, and transmits the converted signal to the brightness control unit 50. The brightness control unit 50 extracts maximum and minimum brightness values and voltages applied in each gray level by the brightness level from the signal. The brightness control unit 50 subdivides a γ curve applied to each gray level by using the extracted minimum brightness value and a difference value between the maximum and minimum brightness values, and sets voltage sections by the subdivided γ curves. In addition, the brightness control unit 50 controls brightness by applying different voltages by the set voltage sections, and transmits the brightness-controlled RGB or YUV signals to the LCD module 30. The LCD module 30 transmits the brightness-controlled RGB or YUV signals to the LCD 40, so that the user may view the brightness-controlled image. In one embodiment, the gray level number is determined by bits of the YUV signal. For example, when the converted YUV signal has 18 bits, the gray level number is 512.

Figure 4:
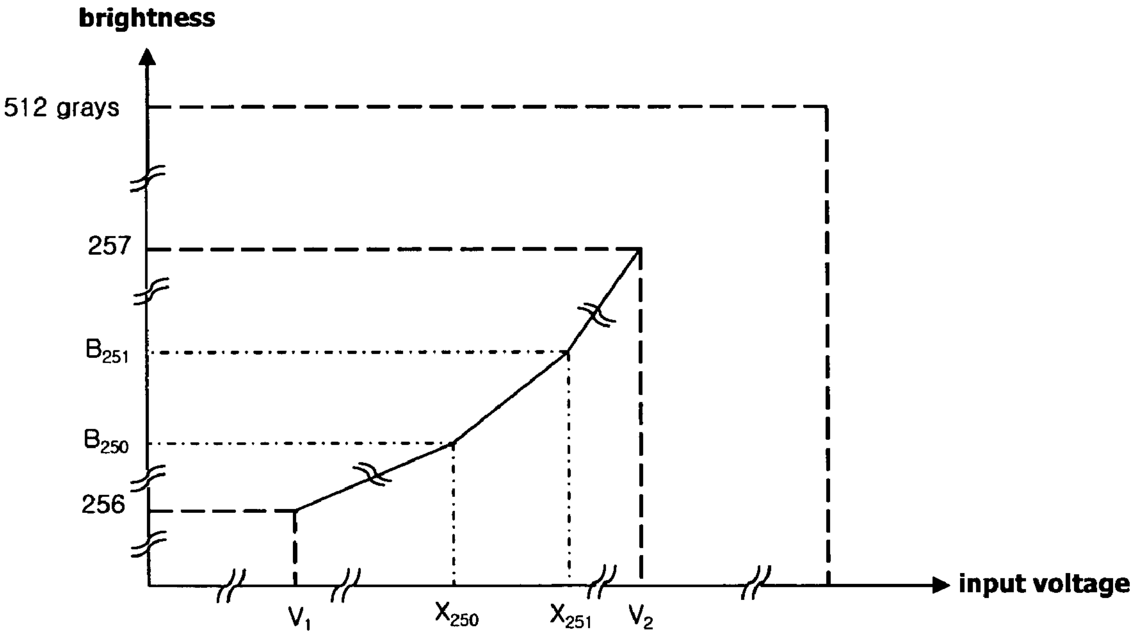
FIG. 4 is a graph showing a relationship between gray levels and input voltages, according to an embodiment of the present invention.

FIG. 4 is a graph showing a relationship between gray levels and input voltages, according to an embodiment of the present invention.

Referring to FIG. 4, the gray levels are subdivided by brightness, the γ curve is controlled by the subdivided gray levels, and different input voltages are inputted by the controlled γ curve. For example, referring to FIG. 4, the gray levels between 256 and 257 are subdivided into B250, B251, etc. by using the maximum and minimum brightness values. The γ curve is then controlled by the subdivided gray levels. Furthermore, the input voltages are subdivided into X250, X251, etc. by the controlled γ curve.

Figure 5:
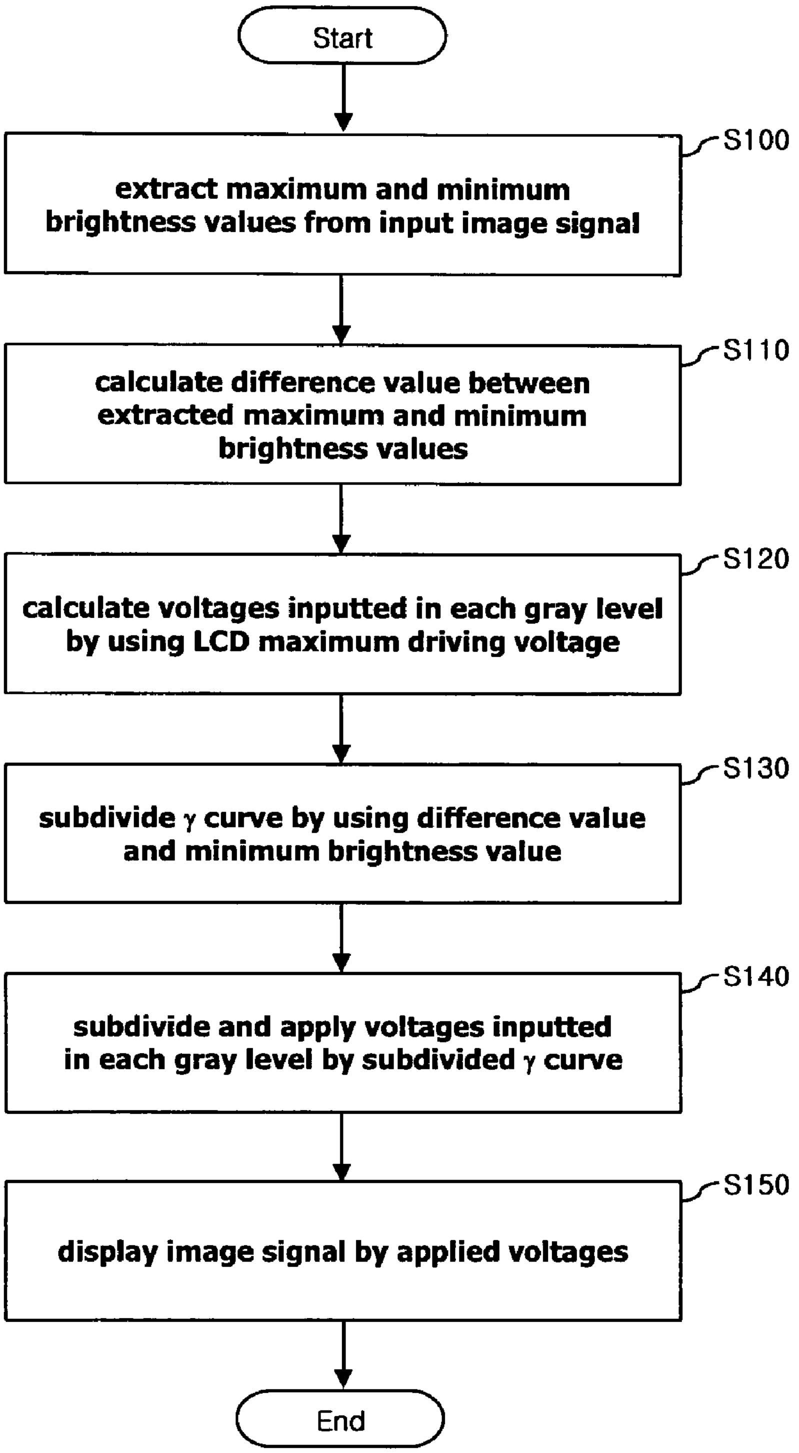
FIG. 5 is a flow diagram illustrating an image display method for an LCD device, according to an embodiment of the present invention.

FIG. 5 is a flow diagram illustrating an image display method for an LCD device, according to an embodiment of the present invention.

The image display method for the LCD device will now be described in detail with reference to FIGS. 3 and 5. In the example described below, it is assumed that the image input display device has 512 gray levels and the maximum voltage inputted to the LCD 40 is V.

When the user attempts to view the image inputted from the camera or the image stored in the storage device of the mobile terminal using the LCD 40, the mobile terminal extracts the maximum brightness value, Bmax, and the minimum brightness value, Bmin, from the image signal inputted to the data input unit 10. The mobile terminal also calculates the difference value (Bdiff=Bmax−Bmin) between the maximum brightness value Bmax and the minimum brightness value, Bmin, by using the extracted maximum and minimum brightness values Bmax and Bmin (S100 and S110). The voltages inputted in each gray level are calculated by dividing the LCD maximum driving voltage V by the gray level number (e.g., 512) (S120). One gray level is divided by the maximum grey level number (e.g., 512) by using the calculated difference value, Bdiff, and the minimum brightness value, Bmin. The subdivided brightness values of Bmin, Bmin+Bdiff/512, Bmin+2*Bdiff/512, Bmin+3*Bdiff/512, . . . , Bmin+512*Bdiff/512 are mapped in the subdivided sections obtained by dividing the gray level by the maximum grey level number (S130). The γ curve is applied by brightness distribution maps obtained by mapping the subdivided brightness values. The voltage sections are then set by the applied γ curve. Furthermore, the voltages corresponding to the set voltage sections are transmitted (S150). For example, referring to FIG. 4, when the brightness values are subdivided into B250, B251, etc. in the gray levels between 256 and 257, the γ curve corresponding to the B250, B251, etc. is subdivided, and the input voltages X250, X251, etc. are inputted by the subdivided γ curves. The image signal having the subdivided brightness values is transmitted to the LCD module 30 by the applied voltages. The LCD module 30 transmits the brightness-controlled RGB or YUV signals to the LCD 40, so that the user may view the brightness-controlled image (S150).

In one embodiment, a display device comprises a data input unit configured to convert an image signal to a color signal. The display device also comprises a brightness control unit operationally coupled to the data input unit, configured to extract a brightness level associated with the color signal, to subdivide the brightness level associated with the color signal, and to apply different voltages according to brightness level subdivisions to control brightness of the color signal. The display device also comprises a display unit configured to display the color signal according to controlled brightness.

The brightness level may comprise gray levels of a γ curve. The color signal may comprise one of YUV or RGB signals. The brightness control unit may comprise means for extracting maximum and minimum brightness values of the color signal and means for subdividing the brightness level using the maximum and minimum brightness values. The brightness control unit may also comprise means for subdividing voltage sections associated with brightness level subdivisions and means for mapping brightness values associated with the brightness level subdivisions to the voltage sections. The brightness control unit may further comprise means for calculating a difference value between the maximum and minimum brightness values. The means for mapping the brightness values may obtain brightness distribution maps by mapping the brightness values one to one. The voltage sections may be set by the brightness distribution maps. The brightness may be controlled by applying voltages by set voltage sections. A number of voltage sections may be equal to a number of the brightness distribution maps. A number of voltage sections may be equal to a number of high distribution maps.

In another embodiment, a display method comprises converting an image signal to a color signal and extracting a brightness level associated with the color signal. The display method also comprises controlling brightness of the color signal by subdividing the brightness level and applying different voltages according to brightness level subdivisions. The display method also comprises displaying the color signal according to controlled brightness.

The step of controlling brightness of the color signal may comprise extracting maximum and minimum brightness values of the color signal and subdividing the brightness level using the maximum and minimum brightness values. The step of controlling brightness of the color signal may also comprise subdividing voltage sections associated with brightness level subdivisions and mapping brightness values associated with the brightness level subdivisions to the voltage sections. The step of controlling brightness of the color signal may further comprise calculating a difference value between the maximum and minimum brightness values. The step of mapping brightness values associated with the brightness level subdivisions to the voltage sections may further comprise obtaining brightness distribution maps by mapping the brightness values one to one.

In yet another embodiment, a mobile terminal configured to display images comprises a transceiver configured to transmit and receive signals and a display device operationally coupled to the transceiver. The display device comprises a data input unit configured to convert an image signal to a color signal. The display device also comprises a brightness control unit operationally coupled to the data input unit, configured to extract a brightness level associated with the color signal, to subdivide the brightness level associated with the color signal, and to apply different voltages according to brightness level subdivisions to control brightness of the color signal. The display device also comprises a display unit configured to display the color signal according to controlled brightness.

The image signal may be provided by the transceiver to the data input unit. The mobile terminal may further comprise a camera operationally coupled to the display device, configured to provide the image signal to the data input unit. The mobile terminal may further comprise a memory operationally coupled to the display device and the camera, configured to store image data associated with an image signal provided by the camera, the image data to provide an image signal to the data input unit.

In accordance with the present invention, the γ curve corresponding to the brightness level of the input image signal is subdivided into the maximum grey levels that may be displayed, and the driving voltages are applied to each cell by the subdivided γ curves. Therefore, characteristics of the γ curve of the LCD module may be improved, and the image may be displayed like a real image.

When the subdivision process is performed by the brightness distribution maps of the input image signal, the high distribution area is subdivided more than the low distribution area to improve the characteristics of the γ curve of the LCD module. A reference value or percent for deciding the degree of the distribution maps may be set to perform the subdivision process using the distribution maps.

Although the present invention has been described with reference to an image input display device for a mobile terminal, the image input display device may also be used in other applications, such as notebook computer screens.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:

a data input unit configured to convert an image signal to a color signal;

a brightness control unit operationally coupled to the data input unit, configured to extract a maximum and minimum brightness level associated with the color signal, to subdivide the brightness level associated with the color signal according to the extracted minimum brightness value and a difference between the extracted maximum brightness value and the extracted minimum brightness value, and to apply a voltage to each brightness level subdivision to control brightness of the color signal; and a display unit configured to display the color signal according to controlled brightness, wherein the brightness control unit:

subdivides voltage sections associated with brightness level subdivisions, maps brightness values associated with the brightness level subdivisions to the voltage sections, and subdivides the brightness level equal to a number of maximum brightness levels which may be displayed for the voltage sections which have a degree of distribution of the brightness value greater than the reference value.

2. The display device of claim 1, wherein the brightness level comprises gray levels of a γ curve.

3. The display device of claim 1, wherein the color signal comprises one of YUV or RGB signals.

4. The display device of claim 1, wherein the brightness control unit comprises:

means for extracting maximum and minimum brightness values of the color signal;

means for subdividing the brightness level using the extracted minimum brightness value and the difference between the extracted maximum brightness value and the extracted minimum brightness value;

means for subdividing voltage sections associated with brightness level subdivisions; and means for mapping brightness values associated with the brightness level subdivisions to the voltage sections.

5. The display device of claim 4, wherein the brightness control unit further comprises means for calculating a difference value between the maximum and minimum brightness values.

6. The display device of claim 4, wherein the means for mapping the brightness values obtains brightness distribution maps by mapping the brightness values one to one.

7. The display device of claim 6, wherein the voltage sections are set by the brightness distribution maps.

8. The display device of claim 7, wherein the brightness is controlled by applying voltages by set voltage sections.

9. The display device of claim 7, wherein a number of voltage sections is equal to a number of the brightness distribution maps.

10. The display device of claim 7, wherein a number of voltage sections is equal to a number of high distribution maps.

11. A display method, comprising:

converting an image signal to a color signal;

extracting a maximum and minimum brightness level associated with the color signal;

controlling brightness of the color signal by subdividing the brightness level signal according to the extracted minimum brightness value and a difference between the extracted maximum brightness value and the extracted minimum brightness value and applying different voltages to each brightness level subdivision; and displaying the color signal according to controlled brightness, wherein controlling brightness of the color signal further comprises:

subdividing the brightness level using the extracted minimum brightness value and the difference between the extracted maximum brightness value and the extracted minimum brightness value;

subdividing voltage sections associated with brightness level subdivisions; and mapping brightness values associated with the brightness level subdivisions to the voltage sections, and wherein the brightness level is subdivided equal to a number of maximum brightness levels which may be displayed for the voltage sections which have a degree of distribution of the brightness value greater than the reference value.

12. The display method of claim 11, wherein the brightness level comprises gray levels of a γ curve.

13. The display method of claim 11, wherein the color signal comprises one of YUV or RGB signals.

14. The display method of claim 11, wherein controlling brightness of the color signal further comprises calculating a difference between the maximum and minimum brightness values.

15. The display method of claim 11, wherein mapping brightness values associated with the brightness level subdivisions to the voltage sections further comprises obtaining brightness distribution maps by mapping the brightness values one-to-one.

16. The display method of claim 15, wherein the voltage sections are set by the brightness distribution maps.

17. The display method of claim 16, wherein the brightness is controlled by applying voltages according to set voltage sections.

18. The display method of claim 17, wherein a number of voltage sections is equal to a number of the brightness distribution maps.

19. The display method of claim 17, wherein a number of voltage sections is equal to a number of high distribution maps.

20. A mobile terminal configured to display images, the mobile terminal comprising:

a transceiver configured to transmit and receive signals; and a display device operationally coupled to the transceiver, the display device comprising:

a data input unit configured to convert an image signal to a color signal;

a brightness control unit operationally coupled to the data input unit, configured to extract a maximum and minimum brightness level associated with the color signal, to subdivide the brightness level associated with the color signal according to the extracted minimum brightness value and a difference between the extracted maximum brightness value and the extracted minimum brightness value, and to apply different voltages according to each brightness level subdivision to control brightness of the color signal; and a display unit configured to display the color signal according to controlled brightness, wherein the brightness control unit subdivides the brightness level equal to a number of maximum brightness levels which may be displayed for the voltage sections which have a degree of distribution of the brightness value greater than the reference value.

21. The mobile terminal of claim 20, wherein the brightness level comprises gray levels of a γ curve.

22. The mobile terminal of claim 20, wherein the color signal comprises one of YUV or RGB signals.

23. The mobile terminal of claim 20, wherein the image signal is provided by the transceiver to the data input unit.

24. The mobile terminal of claim 20, further comprising:

a camera operationally coupled to the display device, configured to provide the image signal to the data input unit.

25. The mobile terminal of claim 24, further comprising:

a memory operationally coupled to the display device and the camera, configured to store image data associated with an image signal provided by the camera, the image data to provide an image signal to the data input unit.

* * * * *